US012548508B2

(12) United States Patent
Tsai et al.

(10) Patent No.: US 12,548,508 B2

(45) Date of Patent: Feb. 10, 2026

(54) ELECTRONIC DEVICE

(71) Applicant: InnoLux Corporation, Miao-Li County (TW)

(72) Inventors: Yu-Shen Tsai, Miao-Li County (TW); Cheng-Hsiao Lin, Miao-Li County (TW); Sheng-Feng Huang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/645,407

(22) Filed: Apr. 25, 2024

(65) Prior Publication Data

US 2024/0404467 A1 Dec. 5, 2024

(30) Foreign Application Priority Data

May 30, 2023 (CN) ......................... 202310618976.4

(51) Int. Cl.
*G09G 3/3233* (2016.01)

(52) U.S. Cl.
CPC ... *G09G 3/3233* (2013.01); *G09G 2300/0842* (2013.01); *G09G 2320/0223* (2013.01); *G09G 2320/0233* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2006/0220571 | A1* | 10/2006 | Howell | H05B 45/28 315/86 |
| 2017/0061865 | A1* | 3/2017 | Park | G09G 3/325 |
| 2017/0061877 | A1* | 3/2017 | Lee | G09G 3/3233 |
| 2020/0159385 | A1* | 5/2020 | Chung | G06F 3/042 |
| 2022/0301500 | A1 | 9/2022 | Shigeta | |
| 2022/0319413 | A1* | 10/2022 | Xuan | G09G 3/3233 |
| 2023/0033778 | A1 | 2/2023 | Jung | |

FOREIGN PATENT DOCUMENTS

| | | |
|---|---|---|
| CN | 115691409 | 2/2023 |

* cited by examiner

*Primary Examiner* — Nicholas J Lee
(74) *Attorney, Agent, or Firm* — Winston Hsu

(57) ABSTRACT

Disclosed is an electronic device including a driving unit, a plurality of sub-pixel circuits and a plurality of control signal lines. Each of the plurality of sub-pixel circuits includes a first switching element and at least one light emitting element, and the sub-pixel circuits are electrically connected to the driving unit in parallel. The control signal lines are electrically connected to the sub-pixel circuits respectively.

19 Claims, 7 Drawing Sheets

ELECTRONIC DEVICE

BACKGROUND OF THE DISCLOSURE

1. Field of the Disclosure

The present disclosure relates to an electronic device and particularly to an electronic device utilizing a driving unit to driving sub-pixel circuits.

2. Description of the Prior Art

With the rapid development of technology, electronic devices with display functions have been widely used in daily life. In self-luminous display devices of prior art, pixel circuits located in the display region include light emitting elements for generating light to display images. However, in order to drive the light emitting element, a current with a higher duty ratio needs to be provided, and more and more driving elements and switching elements need to be installed in one of the pixel circuits to provide a stable current. Therefore, there is an issue of obvious voltage drop (IR drop) when driving the light emitting element. Alternatively, in order to produce a display device with high resolution, line widths of power lines used to transmit the driving currents to the light emitting elements needs to be shrunk, which results in the increased resistances of the power lines. Accordingly, the issue of the voltage drop becomes worse.

SUMMARY OF THE DISCLOSURE

An objective of the present disclosure is to provide an electronic device.

An embodiment of the present disclosure provides an electronic device including a driving unit, a plurality of sub-pixel circuits and a plurality of control signal lines. Each of the plurality of sub-pixel circuits includes a first switching element and at least one light emitting element, and the sub-pixel circuits are electrically connected to the driving unit and electrically connected to one another in parallel. The control signal lines are electrically connected to the sub-pixel circuits respectively.

These and other objectives of the present disclosure will no doubt become obvious to those of ordinary skill in the art after reading the following detailed description of the embodiment that is illustrated in the various figures and drawings.

DETAILED DESCRIPTION

Figure 1:
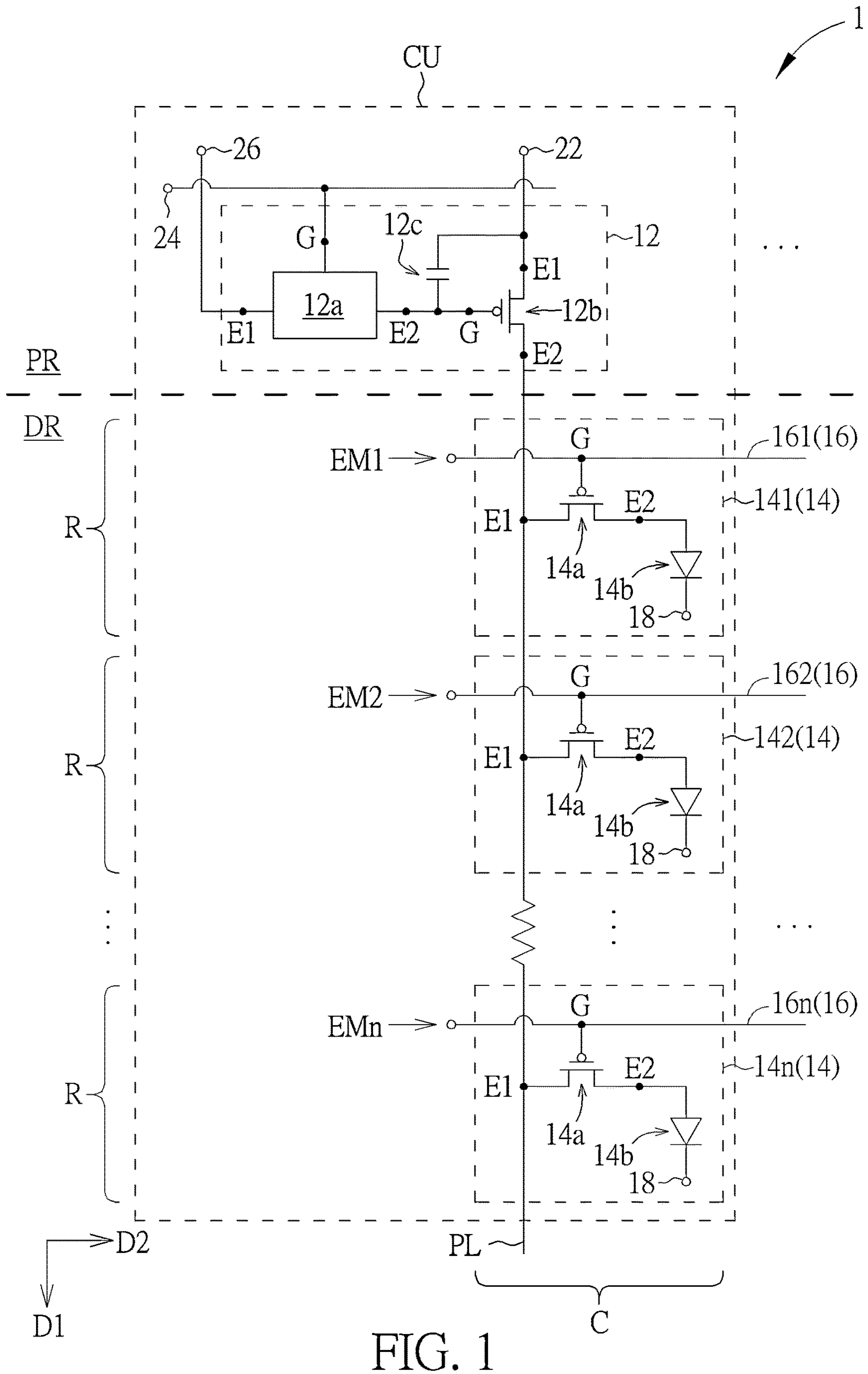
FIG. 1 is a schematic circuit diagram of an electronic device according to a first embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and elements therein may not be drawn to scale. The numbers and sizes of the elements in the drawings are just illustrative and are not intended to limit the scope of the present disclosure.

Certain terms are used throughout the specification and the appended claims of the present disclosure to refer to specific elements. Those skilled in the art should understand that electronic equipment manufacturers may refer to an element by different names, and this document does not intend to distinguish between elements that differ in name but not function. In the following specification and claims, the terms "comprise", "include" and "have" are open-ended fashion, so they should be interpreted as "including but not limited to . . . ".

The ordinal numbers used in the specification and the appended claims, such as "first", "second", etc., are used to describe the elements of the claims. It does not mean that the element has any previous ordinal numbers, nor does it represent the order of a certain element and another element, or the sequence in a manufacturing method. These ordinal numbers are just used to make a claimed element with a certain name be clearly distinguishable from another claimed element with the same name.

In addition, when one element or layer is "electrically connected to" another element or layer, it may be understood that the element or layer is directly electrically connected to the another element or layer, and alternatively, another intervening element or layer may be between the element or layer and the another element or layer (indirectly). On the contrary, when the element or layer is "directly electrically connected to" the another element or layer, it may be understood that the element or layer and the another element or layer are electrically connected to each other without through another intervening element or layer. Also, the term "electrically connected" or "coupled" includes means of direct or indirect electrical connection.

As disclosed herein, the terms "approximately", "essentially", "about", or "substantially" generally mean within 20%, 10%, 5%, 3%, 2%, 1%, or 0.5% of the reported numerical value or range. The quantity disclosed herein is an approximate quantity, that is, without a specific description of "approximately", "essentially", "about", or "substantially", the quantity may still include the meaning of "approximately", "essentially", "about", or "substantially".

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a specific definition in the embodiments of the present disclosure.

In the present disclosure, an electronic device may be bendable, stretchable, foldable, rollable, and/or flexible electronic device, but not limited thereto. The electronic device may include, for example, a light emitting device, a sensing device, a display device, an antenna device, a touch device, a tiled device, or other suitable electronic devices, but not limited thereto. The display device may, for example, be applied to a laptop, a public display, a tiled display, a vehicle display, a touch display, a television, a monitor, a smartphone, a tablet, a light source module, a lighting device or an electronic device applied to the above product, but not limited thereto. The sensing device may, for example, be a sensing device used for detecting change in capacitances, light, heat, or ultrasound, but not limited thereto. The sensing device may, for example, include a biosensor, a touch sensor, a fingerprint sensor, other suitable sensors or any combination of sensors mentioned above. The display device may, for example, include a light emitting diode, a fluorescent material, a phosphor material, other suitable display mediums, or any combination thereof, but not limited thereto. The light emitting diode may, for example, include an organic light emitting diode (OLED), a mini light emitting diode (mini-LED), a micro light emitting diode (micro LED), a quantum dot light emitting diode (e.g., QLED or QDLED), other suitable elements or any combination of elements mentioned above. The antenna device may, for example, include liquid crystal antenna, varactor diode antenna, or antennas of other types, but not limited thereto. The tiled device may, for example, include a tiled display device or a tiled antenna device, but not limited thereto. Furthermore, the appearance of the electronic device may be rectangular, circular, polygonal, a shape with curved edges, curved or other suitable shapes, but not limited thereto. The electronic device may have peripheral systems such as a driving system, a control system, a light source system, a shelf system, etc. The electronic device may include electronic units, in which the electronic units may include a passive element and an active element, and for example include a capacitor, a resistor, an inductor, a diode, a transistor, a sensor, etc. It is noted that the electronic device of the present disclosure may be any combination of the above-mentioned devices, but not limited thereto. The electronic device as mentioned herein and shown in the drawings takes a self-luminous display device as an example to describe the present disclosure, but the present disclosure is not limited thereto.

Refer to FIG. 1, which is a schematic circuit diagram of an electronic device according to a first embodiment of the present disclosure. As shown in FIG. 1, the electronic device 1 may include a driving unit 12, a plurality of sub-pixel circuits 14 and a plurality of control signal lines 16. Each sub-pixel circuit 14 may include a switching element **14*a* and at least one light emitting element 14*b*, wherein the sub-pixel circuits 14 are electrically connected to the driving unit 12 and are electrically connected to one another in parallel, and the control signal lines 16 are electrically connected to the sub-pixel circuits 14 respectively. It should be noted that since different sub-pixel circuits 14 are electrically connected to the same driving unit 12 in parallel, the number of elements in each sub-pixel circuit 14 may be shrunk, thereby reducing a voltage drop (IR drop) of each sub-pixel circuit 14 or simplifying the layout structure of the sub-pixel circuits 14. Accordingly, complexity in manufacturing may be reduced to improve production yield, or it helps to increase resolution of the electronic device 1**.

In this embodiment, the driving unit 12 may be used to drive the sub-pixel circuits 14 electrically connected thereto, and each control signal line 16 may be used to provide a control signal to a corresponding one of the sub-pixel circuits 14 to control on/off state of the corresponding switching element **14*a*, so that light emitting times of the light emitting elements 14*b* may be controlled. The electronic device 1 may further include a power line PL for electrically connecting the driving unit 12 to the sub-pixel circuits 14, and the sub-pixel circuits 14 may be electrically connected in parallel with one another through the power line PL. In FIG. 1, the power line PL may, for example, extend along the first direction D1**, but not limited thereto.

In the embodiment of FIG. 1, the electronic device 1 may have a light emitting region DR, in which the sub-pixel circuits 14 are disposed in the light emitting region DR, the driving unit 12 is disposed outside the light emitting region DR, and the power line PL extends from the light emitting region DR to the outside of the light emitting region DR. For example, when the electronic device 1 is a display device, the light emitting region DR may be, for example, a display region of the display device, and the driving unit 12 may be disposed in a peripheral region PR located outside the display region. In this case, since the driving unit 12 may be disposed outside the display region, and the number of elements in the sub-pixel circuits 14 disposed in the display region may be reduced, a line width of the power line PL may be increased to reduce the voltage drop caused by the resistance of the power line PL. Accordingly, the light emitting area of the light emitting elements **14*b* may be increased to improve its brightness, and/or the density of the sub-pixel circuits 14 may be increased to improve the image resolution of the electronic device 1**.

In the embodiment of FIG. 1, the sub-pixel circuits 14 electrically connected to the same driving unit 12 may be arranged in the same column (column) C along the first direction D1, that is, they are located in the same sub-pixel column, but not limited thereto. For example, all the sub-pixel circuits 14 arranged in the same column C may be electrically connected to the same driving unit 12, but not limited thereto. Although FIG. 1 shows one driving unit 12 and the sub-pixel circuits 14 of one column C, the present disclosure is not limited thereto. In some embodiments, the electronic device 1 may, for example, include a plurality of circuit units CU, wherein each circuit unit CU may include at least one driving unit 12, the sub-pixel circuits 14 of the same column C, and a power line PL, and the circuit units CU may be arranged along the second direction D2, such that the sub-pixel circuits 14 arranged in the same row R may be electrically connected to the same control signal line 16, but the present disclosure is not limited thereto. For clarity, the electronic device 1 is described below using a circuit unit CU as an example, but not limited thereto.

As shown in FIG. 1, in each sub-pixel circuit 14, the switching element **14*a* may be used to turn on or off the light emitting element 14*b*, and the light emitting element 14*b* may be used to generate light as light from a single sub-pixel or light source for the single sub-pixel. For example, the light emitting element 14*b* may generate red light, light, green light, blue light or other suitable color light. Therefore, the electronic device 1 of this embodiment may be a self-luminous display device, but not limited thereto. The light emitting element 14*b* may include, for example, the above-mentioned light emitting diode or other suitable light emitting element. Specifically, each switching element 14***a* may have a control end G, a first end E1 and a second end E2, wherein the control end G may be electrically connected to the corresponding control signal line 16, the first end E1 may be electrically connected to the driving unit 12, and the second end E2 is electrically connected to an anode of the light emitting element 14*b*. A cathode of the light emitting element 14*b* is electrically connected to a power source 18, and the power source 18 may provide a voltage to the cathode of the light emitting element 14*b*. In the embodiment of FIG. 1, the switching element 14*a* may be a P-type transistor, and the control end G, the first end E1 and the second end E2 may be respectively a gate, a source and a drain of the P-type transistor, but not limited thereto. In some embodiments, the switching element 14*a* may be for example an N-type transistor. Structures of the transistors may include, for example, thin film transistors or other types of transistor structures. In different sub-pixel circuits 14, the light emitting elements 14*b* may be electrically connected to the same power source 18. The control signal lines 16 may be used to provide corresponding control signals (e.g., a control signal EM1, a control signal EM2 . . . and a control signal EMn) to the corresponding sub-pixel circuits 14 respectively, so that the switching elements 14*a* may turn on or off the light emitting elements 14*b* to control the light emitting times of the light emitting elements 14*b* according to the corresponding control signals. In other words, the light emitting elements 14*b* of the sub-pixel circuits 14 may emit light according to the control signals provided by the control signal lines 16. The control signal lines 16 may, for example, be electrically connected to a gate driving circuit.

In the embodiment of FIG. 1, the driving unit 12 may include a switching element 12*a* and a driving element 12*b*, wherein each of the switching element 12*a* and the driving element 12*b* may have a control end G, a first end E1 and a second end E2. The control end G, the first end E1 and the second end E2 of the driving element 12*b* may be electrically connected to the second end E2 of the switching element 12*a*, another power source 22 and the sub-pixel circuit 14 respectively. Different driving units 12 may be electrically connected to the same power source 22. The control end G and the first end E1 of the switching element 12*a* may be electrically connected to a scan line 24 and a data line 26 respectively. The scan line 24 may be used to provide a scan signal (e.g., the scan signal SS shown in FIG. 2) to the control end G of the switching element 12*a*, and the data line 26 may be used to provide a data signal (e.g., the data signal DS shown in FIG. 2) to the control end G of the driving element 12*b*. The voltage of the data signal may be controlled to determine a current passing through the second end E2 of the driving element 12*b*, thereby controlling brightness of light from the corresponding light emitting element 14*b*. As shown in FIG. 1, the driving unit 12 may further include a storage capacitor 12*c*, and two ends of the storage capacitor 12*c* may be electrically connected to the control end G and the first end E1 of the driving element 12*b* respectively so as to store the data signal corresponding to the sub-pixel circuits 14. In some embodiments, both two ends of the storage capacitor 12*c* may be electrically connected to the control end G and the second end E2 of the driving element 12*b* respectively.

In this embodiment, the voltage provided by the power source 22 may be greater than the voltage provided by the power source 18. For example, the power source 18 and the power source 22 may be a low voltage source and a high voltage source respectively, but not limited thereto. In FIG. 1, each of the switching element 12*a* and the driving element 12*b* may be, for example, a P-type transistor, and the control end G, the first end E1 and the second end E2 of each of the switching element 12*a* and the driving element 12*b* may be, for example, a gate, a source and a drain of the P-type transistor respectively. In some embodiments, the switching element 12*a* and/or the driving element 12*b* may be an N-type transistor. In some embodiments, the switching element 12*a* and the driving element 12*b* may include, for example, thin film transistors or other types of transistor structures. In some embodiments, the switching element 12*a* and the driving element 12*b* may include, for example, different semiconductor materials to have different electrical properties. In some embodiments, the driving unit 12 may be, for example, a pulse amplitude modulation (PAM) circuit or other suitable circuit. In some embodiments, the driving unit 12 of FIG. 1 may optionally further include a compensation circuit or be electrically connected to a compensation circuit to compensate driving current of the light emitting element 14*b* and/or improve the image quality, contrast or other properties of the electronic device 1.

Figure 2:
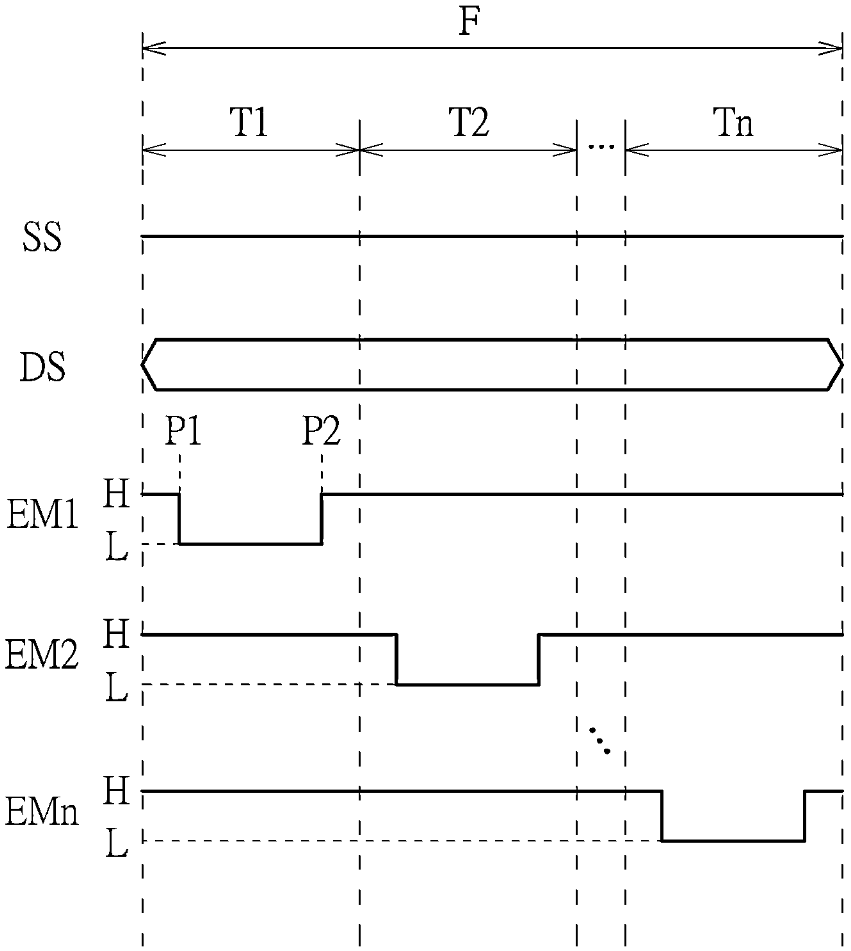
FIG. 2 is a schematic timing diagram illustrating the scan signal, the data signal and the control signals according to the first embodiment of the present disclosure.

The driving method of the circuit unit CU is further detailed below, but not limited thereto. Refer to FIG. 2 as well as FIG. 1. FIG. 2 is a schematic timing diagram illustrating the scan signal, the data signal and the control signals according to the first embodiment of the present disclosure. In the embodiment of FIG. 1, the control signal lines 16 may include, for example, a control signal line 161 to a control signal line 16*n*, and the sub-pixel circuits 14 may include, for example, a sub-pixel circuit 141 to a sub-pixel circuit 14*n* electrically connected to the control signal 161 to the control signal line 16*n* respectively. As shown in FIG. 1 and FIG. 2, the scan signal SS may be, for example, a DC voltage to turn on the switching element 12*a*. In this case, the control ends G of the switching elements 12*a* in different driving units 12 may be electrically connected to the same scan signal SS to turn on different switching elements 12*a* at the same time, but the present disclosure is not limited thereto. The control signal line 161 to the control signal line 16*n* may respectively provide the control signal EM1 to the control signal EMn to the sub-pixel circuit 141 to the sub-pixel circuit 14*n*, and the data signal DS may provide corresponding voltages to the driving element 12*b* according to the timings of the control signal EM1 to the control signal EMn. In some embodiments, adjacent driving units 12 may be electrically connected to different scan signals, so that the switching elements 12*a* of adjacent driving units 12 may be turned on at different times. In this case, the data lines 26 electrically connected to the adjacent driving units 12 may be optionally electrically connected to a demultiplexer, but not limited thereto.

As shown in FIG. 2, in this embodiment, when the switching element 14*a* is for example a P-type transistor, the control signal EM1 to the control signal EMn are all at a high voltage level H in an initial time of a period T1, so that all the switching elements 14*a* are in an off state. During the period T1, the control signal EM1 may be changed from the high voltage level H to a low voltage level L, and the control signal EM2 to the control signal EMn are maintained at the high voltage level H, so that the switching element 14*a* of the sub-pixel circuit 141 is turned on, and the switching elements 14*a* of the sub-pixel circuit 142 to the sub-pixel circuit 14*n* may be in the off state. In this case, the power source 22 may provide corresponding current to the light emitting element 14*b* of the sub-pixel circuit 141 through the driving element 12*b* to generate light of corresponding brightness. In addition, since the sub-pixel circuit 141 to the sub-pixel circuit 14*n* are electrically connected to the same driving unit 12, in order to prevent the data signal DS from being provided to different sub-pixel circuits 14 at the same time, the control signal EM1 may be changed from the low voltage level L to the high voltage level in the period T1 to turn off the switching element 14*a* of the sub-pixel circuit 141, and the control signal EM2 is changed from the high voltage level H to the low voltage level L in a period T2 to turn on the switching element 14*a* of the sub-pixel circuit 142. By analogy, the switching elements 14*a* of the sub-pixel circuit 142 to the sub-pixel circuit 14*n* may be sequentially turned on and off in the period T2 to a period Tn, respectively, so that the corresponding light emitting elements 14*b* may generate light of corresponding brightness, thereby displaying an image. In this case, the light emitting times of the light emitting elements 14*b* of the sub-pixel circuits 14 in this embodiment may not be overlapped with each other, but not limited thereto. It should be noted that the light emitting time of each light emitting element 14*b* in this embodiment may be, for example, a duration from a time point when the corresponding control signal is changed from the high voltage level H to the low voltage level L to another time point when the corresponding control signal is changed from the low voltage level L to the high voltage level H, but not limited thereto. For example, the light emitting time of the light emitting element 14*b* of the sub-pixel circuit 141 may be a duration from a time point P1 to a time point P2 of the control signal EM1. In this embodiment, a sum of the period T1 to the period Tn may be a frame time F of the electronic device 1, but not limited thereto. In some embodiments, when the switching element 14*a* is, for example, an N-type transistor, the control signal EM1 to the control signal EMn may be at the high voltage level H in the period T1 to the period Tn respectively, and they are respectively at the low voltage level L in other non-corresponding periods. For example, the control signal EM1 is at the low voltage level L in the period T2 to the period Tn.

Figure 3:
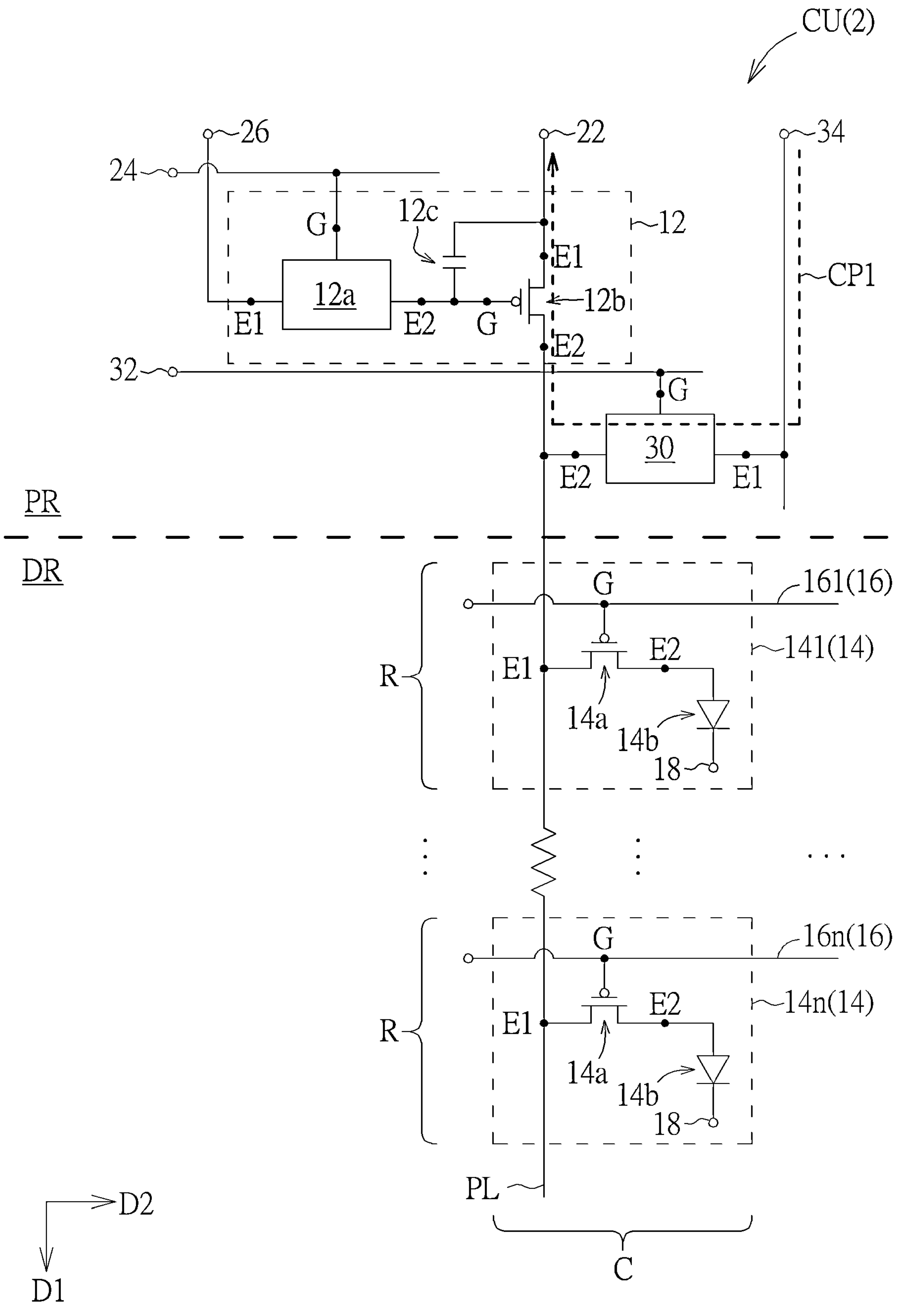
FIG. 3 and FIG. 4 are schematic circuit diagrams of an electronic device according to a second embodiment of the present disclosure.
Figure 4:
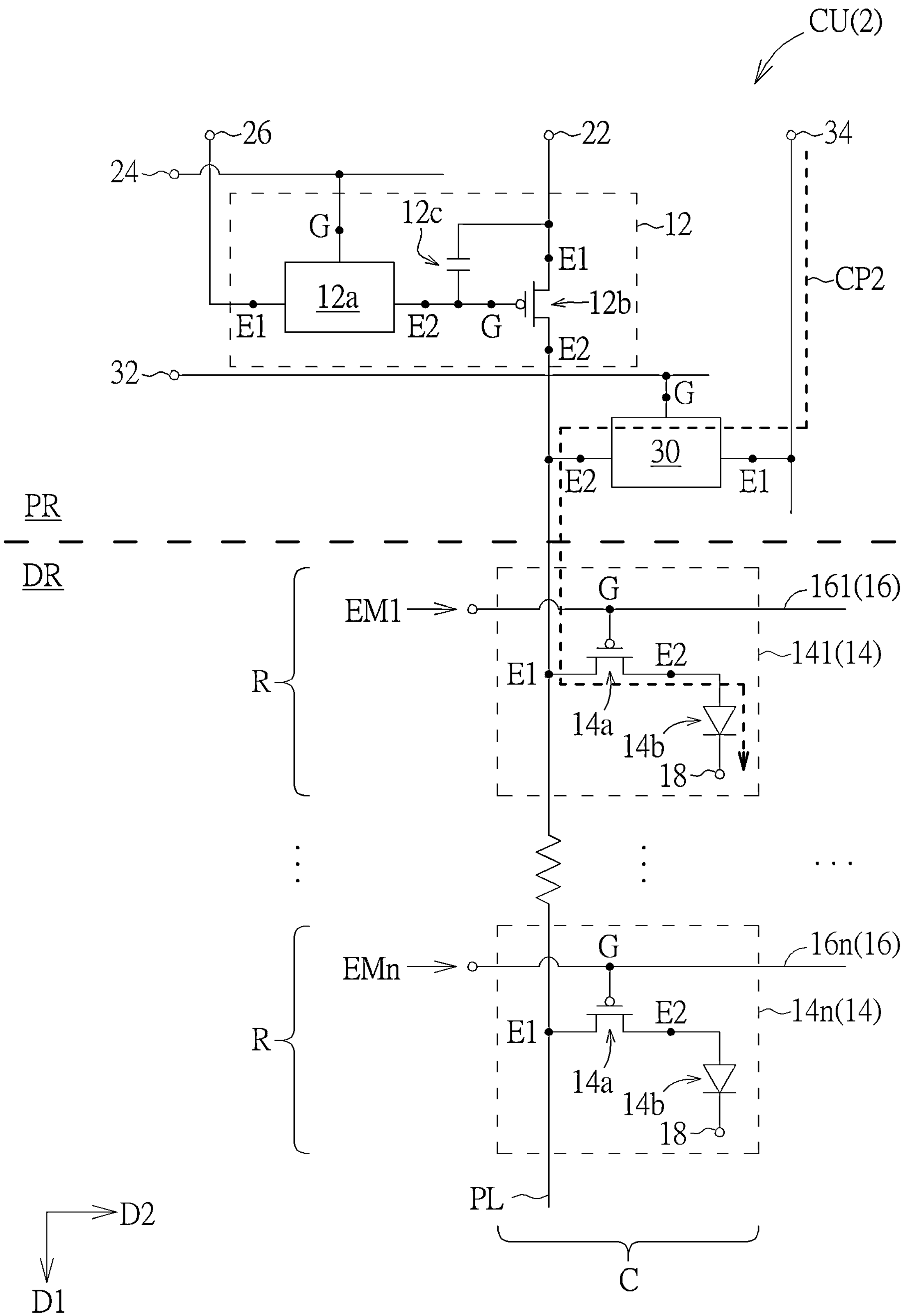

Refer to FIG. 3 and FIG. 4. FIG. 3 and FIG. 4 are schematic circuit diagrams of an electronic device according to a second embodiment of the present disclosure, wherein FIG. 3 and FIG. 4 further show the current paths when inspecting the driving element 12*b* and the switching element 14*a* respectively. As shown in FIG. 3 and FIG. 4, the electronic device 2 of this embodiment differs from the electronic device 1 shown in FIG. 1 in that the circuit unit CU may further include a sensing circuit 30 electrically connected to the driving unit 12. In order to clearly illustrate the electronic device 2, FIG. 3 and FIG. 4 show a single circuit unit CU, but the disclosure is not limited thereto. In some embodiments, the electronic device 2 may include, for example, a plurality of circuit units CU arranged along the second direction D2.

In the embodiment of FIG. 3 and FIG. 4, the sensing circuit 30 may, for example, include a sensing switching element, and the control end G, the first end E1 and the second end E2 of the sensing switching element are electrically connected to a sensing control line 32, the driving unit 12 and a reference voltage terminal 34 respectively. For example, the sensing switching element may be a transistor, but not limited thereto. Through the sensing circuit 30, conditions of the driving element 12*b* in the driving unit 12 and the switching element 14*a* in each sub-pixel circuit 14 may be inspected to determine whether to further compensate the driving element 12*b* and/or the switching element 14*a*. For example, the sensing control line 32 may provide a sensing control signal to the sensing circuit 30 when inspecting the driving element 12*b* or the switching element 14*a*, and the reference voltage terminal 34 may be used to detect the inspecting signal.

The method of inspecting the driving element 12*b* is further described below. As shown in FIG. 3, when the driving element 12*b* is inspected, all control signal lines 16 provide turn-off signals to the sub-pixel circuits 14, such that the switching elements 14*a* of all sub-pixel circuits 14 are in the off state. For example, all control signals are at the high voltage level, but not limited thereto. In this case, a current path CP1 may be formed between the reference voltage terminal 34 and the power source 22, and the current path CP1 passes through the driving element 12*b* and the sensing circuit 30. At this time, the sensing control line 32 may provide a turn-on signal to the sensing circuit 30 to conduct the first end E1 and the second end E2 of the sensing circuit 30, and the scan line 24 may provide a turn-on signal to the switching element 12*a* to turn on the switching element 12*a*. After that, by providing a data signal on the data line 26, the driving element 12*b* may provide a driving current between the first end E1 and the second end E2, and an electrical property of the driving element 12*b* may be obtained by measuring the driving current and a voltage difference between the reference voltage terminal 34 and the power source 22. In this way, whether the electrical property of the driving element 12*b* is changed may be further inspected. When the electrical property of the driving element 12*b* is changed, the driving current may be compensated to maintain luminous stability or image quality of the electronic device 2, for example, by adjusting the voltage of the data signal or other conditions. As shown in FIG. 3, the current path CP1 may for example flow from the reference voltage terminal 34 to the power source 22. In some embodiments, the current path CP1 may flow from power source 22 to reference voltage terminal 34, but not limited thereto.

As shown in FIG. 4, the method of inspecting one of the switching elements 14*a* may for example include following steps. When inspecting the switching element 14*a*, the driving element 12*b* may be turned off, such that another current path CP2 may be formed between the reference voltage terminal 34 and the power source 18, which passes through the sensing circuit 30 and the corresponding switching element 14*a*. At this time, the sensing control line 32 may provide a turn-on signal to the sensing circuit 30 to conduct the first end E1 and the second end E2 of the sensing circuit 30, and one of the control signal lines 16 may provide the control signal at the low voltage level. The other control signal lines 16 provide the control signals at the high voltage level, such that the current path CP2 may pass through the corresponding switching element 14*a* to measure the current passing through the switching element 14*a*. According to the measured current of the switching element 14*a* and the voltage difference between the reference voltage terminal 34 and the power source 18, the electrical properties of the switching element 14*a* and the light emitting element 14*b* may be obtained. For example, the control signal line 161 may provide the control signal EM1 at the low voltage level, and the control signal lines EM2 to the control signal line 16*n* may respectively provide the control signal EM2 to the control signal EMn at the high voltage level, so that the electrical properties of the switching element 14*a* and the light emitting element 14*b* of the sub-pixel circuit 141 may be measured. By analogy, the electrical properties of the switching elements 14*a* and the light emitting elements 14*b* of other sub-pixel circuits 14 may be measured. In this way, whether the electrical properties of the switching elements 14*a* and the light emitting elements 14*b* are changed is able to be inspected. When the electrical properties of the switching elements 14*a* and the light emitting elements 14*b* are changed, a corresponding compensation method may be performed to maintain the luminous stability or image quality of the electronic device 2. As shown in FIG. 4, the current path CP2 may flow from the reference voltage terminal 34 to the power source 18, but not limited thereto.

Figure 5:
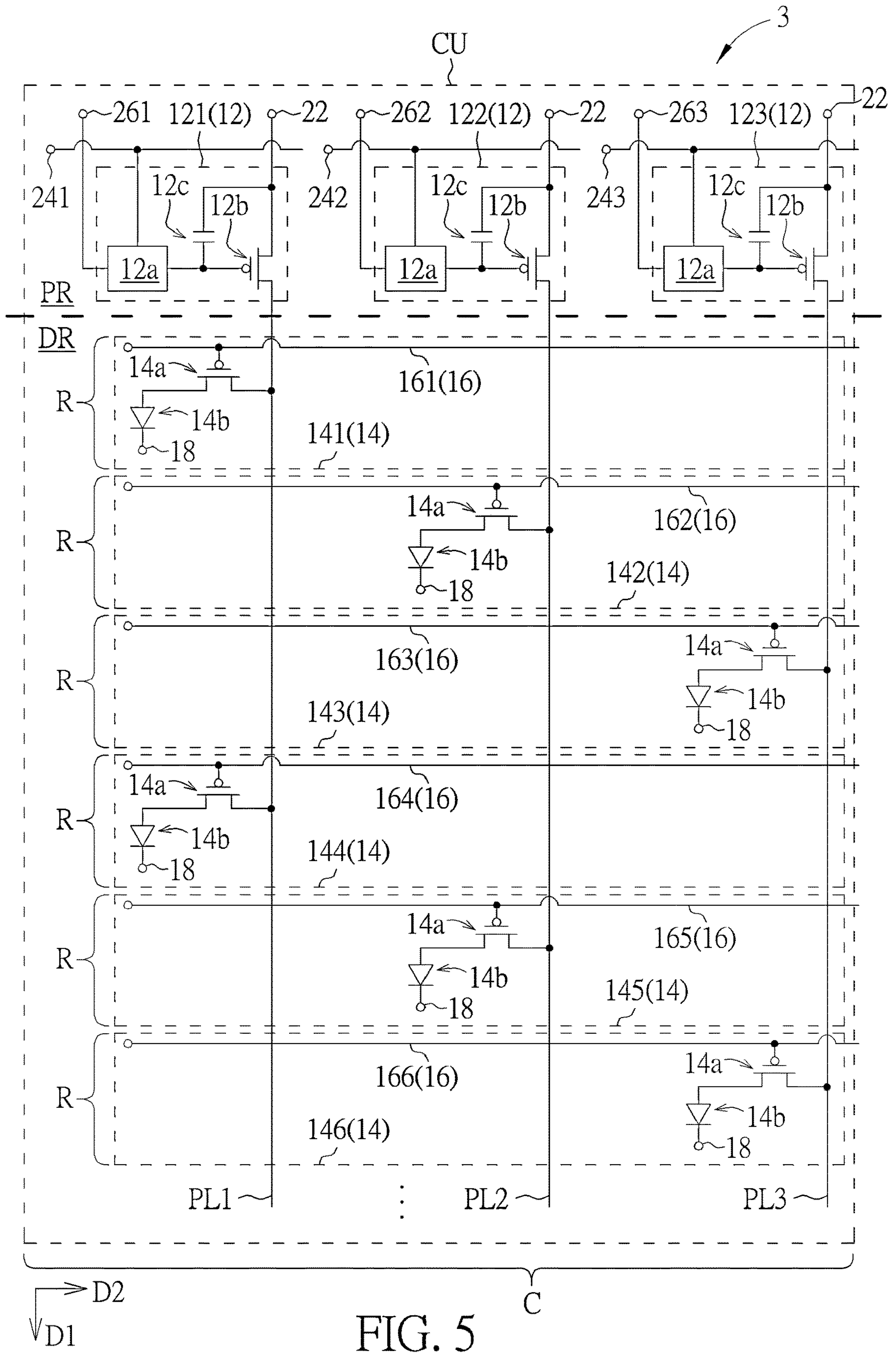
FIG. 5 is a schematic circuit diagram of an electronic device according to a third embodiment of the present disclosure.

Refer to FIG. 5, which is a schematic circuit diagram of an electronic device according to a third embodiment of the present disclosure. As shown in FIG. 5, the electronic device 3 provided in this embodiment differs from the electronic device 1 shown in FIG. 1 in that two adjacent sub-pixel circuits 14 arranged in the same column C may be electrically connected to two different driving units 12 respectively. In other words, one circuit unit CU may include a plurality of driving units 12, and the sub-pixel circuits 14 electrically connected to the driving units 12 may be sequentially and alternately arranged in the same column C. For example, when the circuit unit CU includes two driving units 12, the driving units 12 may respectively control the light emitting times of the light emitting elements 14*a* of the (2N−1)th sub-pixel circuits 14 and the light emitting times of the light emitting elements 14*a* of the (2N)th sub-pixel circuits 14, where N is a positive integer. When the circuit unit CU includes three driving units 12, the driving units 12 may respectively control the light emitting times of the light emitting elements 14*a* of the (3N−2)th sub-pixel circuits 14, the light emitting times of the light emitting elements 14*a* of the (3N−1)th sub-pixel circuits 14 and the light emitting times of the light emitting elements 14*a* of the (3N)th sub-pixel circuits 14. By analogy, the structure of the sub-pixel circuits 14 electrically connected to the driving units 12 may be adjusted with the number of the driving units 12. It should be noted that since two adjacent sub-pixel circuits 14 may be controlled by different driving units 12, the light emitting times of the light emitting elements 14*b* of two adjacent sub-pixel circuits 14 may be at least partially overlapped with each other, so as to increase the light emitting time of the light emitting element 14*b* of each sub-pixel circuit 14. For example, when the circuit unit CU includes M driving units 12, the light emitting time of the light emitting element 14*b* may be, for example, substantially M times the light emitting time in the case that the circuit unit CU includes a single driving unit 12, where M may be a positive integer greater than 1.

In some embodiments, when the circuit unit CU includes three driving units 12, at least two of the light emitting element 14*b* of each of the (3N−2)th sub-pixel circuits 14, the light emitting element 14*b* of each of the (3N−1)th sub-pixel circuits 14 and the light emitting element 14*b* of each of the (3N)th sub-pixel circuits 14 may generate light of different colors respectively, for example, the light emitting elements 14*b* may generate red light, green light and blue light respectively, but not limited thereto.

In the circuit unit CU of FIG. 5, the driving unit 12 including a driving unit 121, a driving unit 122 and a driving unit 123, the power lines including a power line PL1, a power line PL2 and a power line PL3, the control signal lines 16 including a control signal line 161, a control signal line 162, a control signal line 163, a control signal line 164, a control signal line 165 and a control signal line 166, and the sub-pixel circuits 14 including a sub-pixel circuit 141, a sub-pixel circuit 142, a sub-pixel circuit 143, a sub-pixel circuit 144, a sub-pixel circuit 145 and a sub-pixel circuit 146 sequentially arranged in the same column C are taken as an example for description, but the numbers of the driving units 12, the power lines, the control signal lines 16 and the sub-pixel circuits 14 are not limited thereto. The driving unit 121 is electrically connected to the switching elements 14*a* of the sub-pixel circuit 141 and the sub-pixel circuit 144 through the power line PL1. The driving unit 122 is electrically connected to the switching elements 14*a* of the sub-pixel circuit 142 and the sub-pixel circuit 145 through the power line PL2. The driving unit 123 is electrically connected to the switching elements 14*a* of the sub-pixel circuit 143 and the sub-pixel circuit 146 through the power line PL3. Also, in the driving unit 121, the driving unit 122 and the driving unit 123, the control ends of the switching elements 12*a* may be electrically connected to a scan line 241, a scan line 242 and a scan line 243 respectively, and the first ends of the switching elements 12*a* may be electrically connected to a data line 261, a data line 262 and a data line 263.

Figure 6:
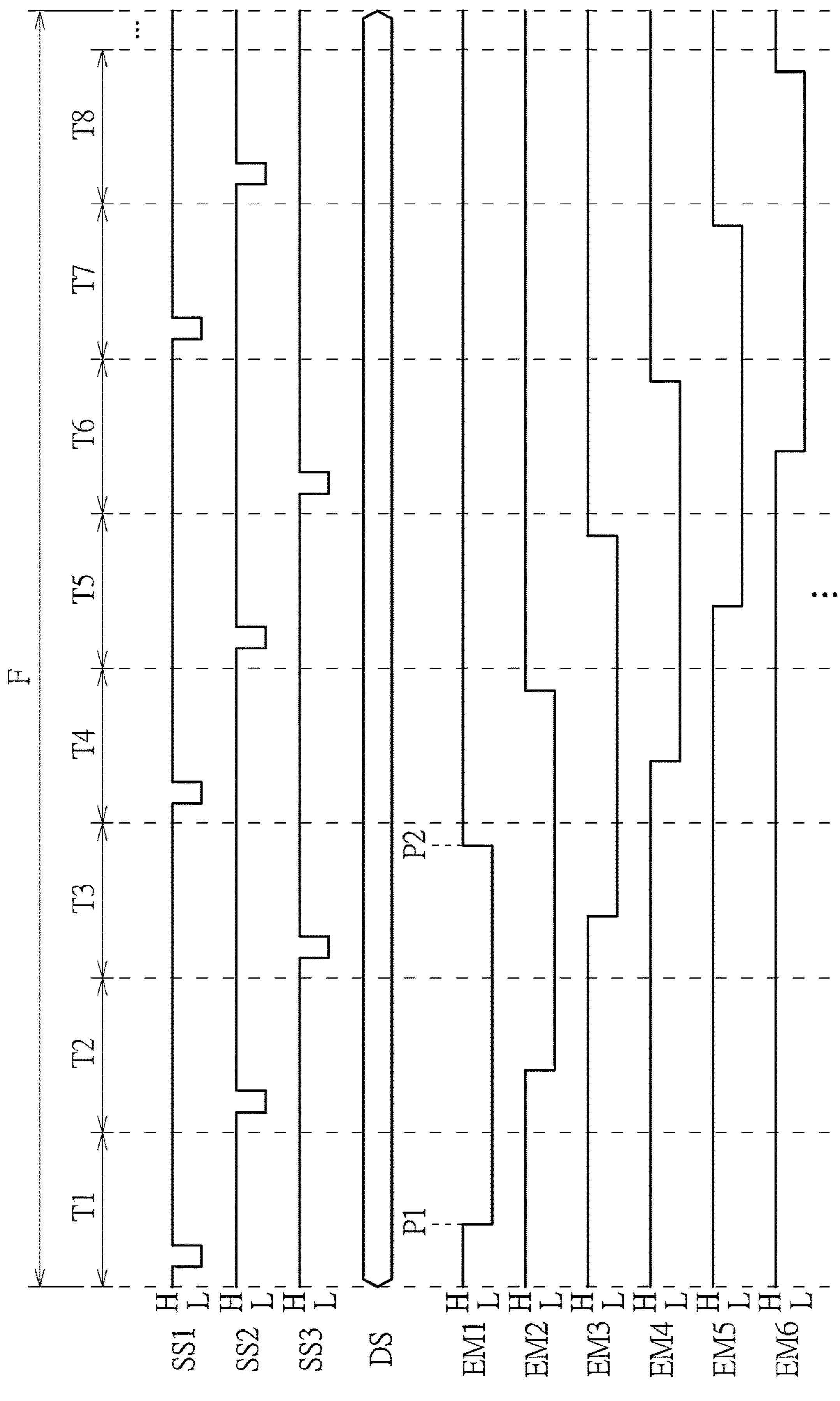
FIG. 6 is a schematic timing diagram of the scan signals, the data signal and the control signals according to the third embodiment of the present disclosure.

The driving method of the circuit unit CU in FIG. 5 is further described below, but not limited thereto. Refer to FIG. 6 together with FIG. 5. FIG. 6 is a schematic timing diagram of the scan signals, the data signal and the control signals according to the third embodiment of the present disclosure. As shown in FIG. 5 and FIG. 6, the scan line 241, the scan line 242 and the scan line 243 may respectively provide a scan signal SS1, a scan signal SS2 and a scan signal SS3 to the driving unit 121, the driving unit 122 and the driving unit 123. In this embodiment, the scan signal SS1, the scan signal SS2 and the scan signal SS3 may turn on the corresponding switching elements 12*a* in different periods. For example, the scan line 241, the scan line 242 and the scan line 243 may be electrically connected to the same scan signal terminal through a demultiplexer or electrically connected to different scan signal terminals respectively, but not limited thereto. When the switching elements 12*a* are for example the P-type transistors, the scan signal SS1 may be at the low voltage level L in the period T1 to turn on the switching element 12*a* of the driving unit 121; the scan signal SS2 may be at the low voltage level L in the period T2 to turn on the switching element 12*a* of the driving unit 122; the scan signal SS3 may be at the low voltage level L in the period T3 to turn on the switching element 12*a* of the driving unit 122; and so on. The data signal DS may provide corresponding data voltages sequentially to the switching elements 12*a* of the driving unit 121, the driving unit 122 and the driving unit 123, for example, through the demultiplexer, but not limited thereto. The control signal line 161 to the control signal line 166 may respectively provide the control signal EM1 to the control signal EM6 to the sub-pixel circuit 141 to the sub-pixel circuit 146 according to the timings of the scan signal SS1, the scan signal SS2 and the scan signal SS3.

In this embodiment, when the switching elements 14*a* are, for example, the P-type transistors, the control signal EM1 to the control signal EM6 are all at the high voltage level H in the initial time of the period T1, so that all the switching elements 14*a* are in the off state. In the period T1, the control signal EM1 may be changed from the high voltage level H to the low voltage level L, so the switching element 14*a* of the sub-pixel circuit 141 is turned on, and the light emitting element 14*b* of the sub-pixel circuit 141 generates corresponding light. Since the sub-pixel circuit 142 is electrically connected to the driving unit 122 different from the driving unit 121, in the period T2, the control signal EM1 may still be at the low voltage level L, and the control signal EM2 may be changed from the high voltage level H to the low voltage level L. Accordingly, the switching element 14*a* of the sub-pixel circuit 142 is turned on, such that the light emitting element 14*b* of the sub-pixel circuit 142 generates corresponding light. Similarly, in the period T3, the control signal EM1 and the control signal EM2 may still be at the low voltage level L, and the control signal EM3 may be changed from the high voltage level H to the low voltage level L. Accordingly, the switching element 14*a* of the sub-pixel circuit 143 is turned on, such that the light emitting element 14*b* of the sub-pixel circuit 143 generates corresponding light. In other words, the light emitting times of the light emitting elements 14*b* of the sub-pixel circuit 141, the sub-pixel circuit 142 and the sub-pixel circuit 143 may be partially overlapped with each other. In addition, since the control signal EM1 and the control signal EM4 are respectively provided to the sub-pixel circuit 141 and the sub-pixel circuit 144 that are electrically connected to the same driving unit 121, the control signal EM1 may be changed from the low voltage level L to the high voltage level H in the period T3 to turn off the switching element 14*a* of the sub-pixel circuit 141, and the control signal EM4 may be changed from the high voltage level H to the low voltage level L in the period T4 to turn on the switching element 14*a* of the sub-pixel circuit 144. By analogy, the control signal EM2 and the control signal EM3 may be changed from the low voltage level L to the high voltage level H in the period T4 and the period T5 respectively, while the control signal EM5 and the control signal EM6 may be changed from the high voltage level H to the low voltage level L in the period T5 and the period T6 respectively. Moreover, the control signal EM4, the control signal EM5 and the control signal EM6 may be changed from the low voltage level L to the high voltage level H respectively in the period T6, the period T7 and the period T8. Through the above driving method, one of the light emitting times of the light emitting elements 14*b* of the sub-pixel circuit 141 to the sub-pixel circuit 146 may be extended to a duration of more than one period (e.g., the period T1) so as to increase the light emitting times of the light emitting elements 14*b* to improve image quality of the electronic device 3 through driving the sub-pixel circuits 14 of the same column C by plural driving units 12. By analogy, the light emitting times of the light emitting elements 14*b* of other sub-pixel circuits 14 may be extended. In one embodiment, the duration of each period in FIG. 6 may be the same as the duration of each period in FIG. 2, but not limited thereto. For example, the light emitting time of the light emitting element 14*b* of the sub-pixel circuit 141 may be the duration from the time point P1 to the time point P2 of the control signal EM1 and may be greater than the duration of each period. In some embodiments, the electronic device 3 of FIG. 5 may also optionally adopt the sensing circuit 30 of FIG. 3, but not limited thereto.

Figure 7:
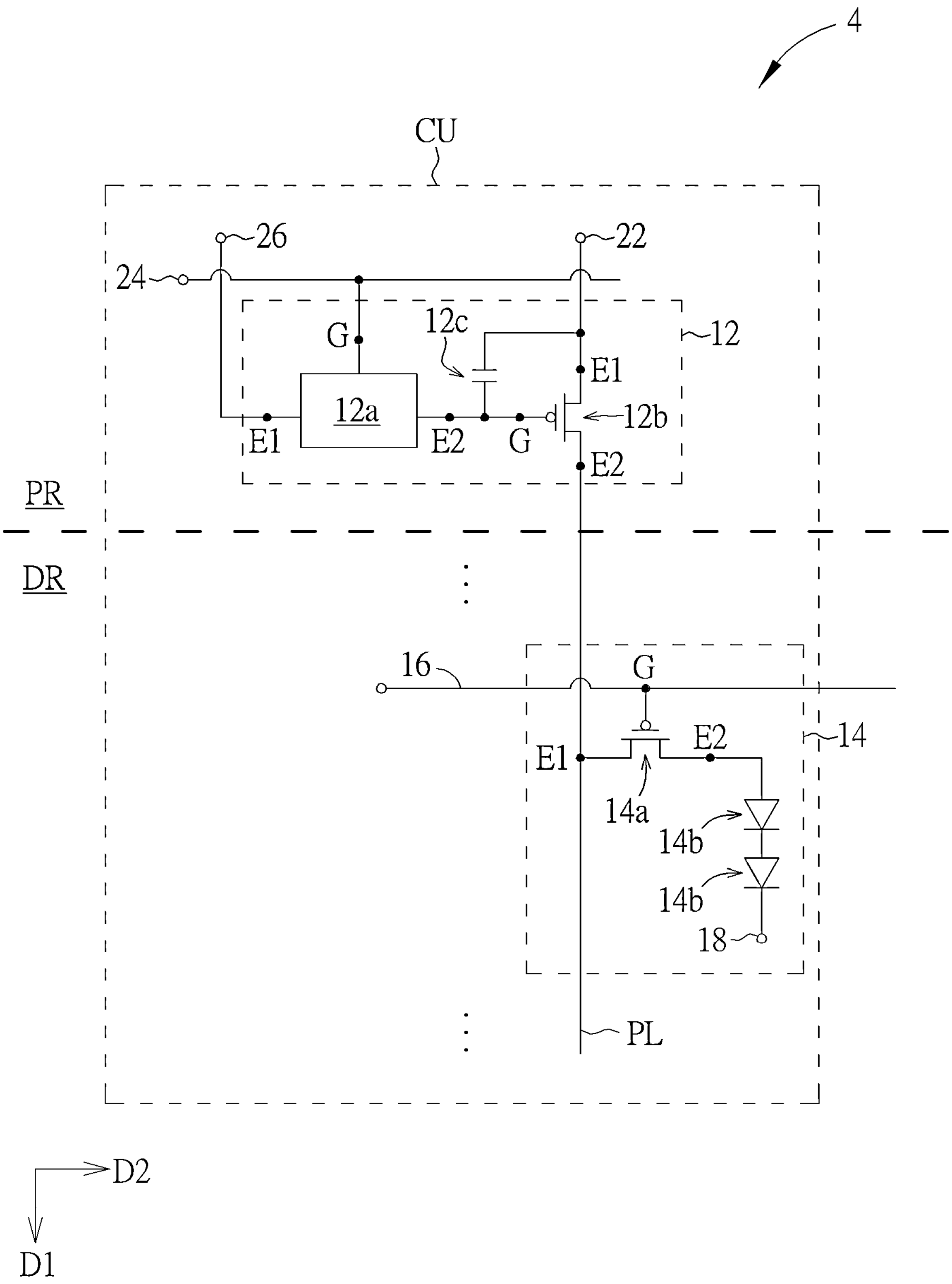
FIG. 7 is a schematic circuit diagram of an electronic device according to a fourth embodiment of the present disclosure.

Refer to FIG. 7, which is a schematic circuit diagram of an electronic device according to a fourth embodiment of the present disclosure. As shown in FIG. 7, the electronic device 4 provided in this embodiment differs from the electronic device 1 in FIG. 1 in that one of the sub-pixel circuits 14 in this embodiment may include a plurality of light emitting elements 14*b*, and the light emitting elements 14*b* are electrically connected in series between the second end E2 of the switching element 14*a* and the power source 18. Since there are plural light emitting elements 14*b* electrically connected in series in single one of the sub-pixel circuits 14, it help to improve the brightness of light from the sub-pixel circuit 14. In some embodiments, the light emitting elements 14*b* connected in series of FIG. 7 may be applied to the above-mentioned embodiments of FIG. 3 or FIG. 5.

In summary, in the electronic device of the present disclosure, since different sub-pixel circuits arranged in the same column are electrically connected to the same driving unit in parallel, the number of elements in each sub-pixel circuit may be reduced, thereby reducing the voltage drop of each sub-pixel circuit or simplifying the layout structure of the sub-pixel circuits. Furthermore, since the driving unit is disposed outside the display region, the number of the elements in the display region may be reduced, and the line width of the power line may be increased to reduce the voltage drop caused by the resistance of the power line, increase the light emitting area of the light emitting elements to increase its brightness, and/or increase the density of the sub-pixel circuits to enhance the image resolution of the electronic device. In addition, through the sensing circuit electrically connected to the driving unit, the driving element of the driving unit and/or the switching elements of the sub-pixel circuits may be compensated to maintain the luminous stability or image quality of the electronic device. Alternatively, the light emitting times of the light emitting elements may be prolonged by using plural driving units to drive different sub-pixel circuits in the same column, thereby improving the image quality of the electronic device.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device comprising:

a driving unit;

another driving unit;

a plurality of sub-pixel circuits, wherein each of the plurality of sub-pixel circuits comprises a first switching element and at least one light emitting element, and at least two of the plurality of sub-pixel circuits are electrically connected to the driving unit and are electrically connected to one another in parallel; and a plurality of control signal lines, wherein the plurality of control signal lines are electrically connected to the at least two of the plurality of sub-pixel circuits respectively, wherein adjacent two of the plurality of sub-pixel circuits are electrically connected to the driving unit and the another driving unit respectively, and light emitting times of the light emitting elements of the adjacent two of the plurality of sub-pixel circuits are at least partially overlapped with each other.

2. The electronic device as claimed in claim 1, wherein the light emitting elements of the plurality of sub-pixel circuits generate light according to control signals provided by the plurality of control signal lines.

3. The electronic device as claimed in claim 1, wherein light emitting times of the light emitting elements of the at least two of the plurality of sub-pixel circuits are not overlapped with each other.

4. The electronic device as claimed in claim 1, wherein in each of the at least two of the plurality of sub-pixel circuits, the first switching element comprises a control end, a first end, and a second end, the control end is electrically connected to one of the plurality of control signal lines, the first end is electrically connected to the driving unit, and the second end is electrically connected to the at least one light emitting element.

5. The electronic device as claimed in claim 1, wherein the at least two of the plurality of sub-pixel circuits are arranged in a same column.

6. The electronic device as claimed in claim 5, further comprising a power line electrically connected to the first switching elements of the at least two of the plurality of sub-pixel circuits.

7. The electronic device as claimed in claim 1, wherein the electronic device has a light emitting region, the plurality of sub-pixel circuits are disposed in the light emitting region, and the driving unit is disposed outside the light emitting region.

8. The electronic device as claimed in claim 1, wherein the driving unit comprises a second switching element and a driving element, the driving element comprises a control end, a first end and a second end electrically connected to the second switching element, a power source and the at least two of the plurality of sub-pixel circuits respectively.

9. The electronic device as claimed in claim 8, wherein the driving unit further comprises a storage capacitor, and two ends of the storage capacitor are electrically connected to the control end and the first end of the driving element respectively.

10. The electronic device as claimed in claim 8, further comprising a scan line and a data line, wherein the second switching element comprises another control end, another first end, and another second end electrically connected to the scan line, the data line and the control end of the driving element respectively.

11. The electronic device as claimed in claim 8, wherein the second switching element is a P-type transistor.

12. The electronic device as claimed in claim 8, wherein in each of the plurality of sub-pixel circuits, the at least one light emitting element is electrically connected between the first switching element and another power source.

13. The electronic device as claimed in claim 12, wherein the power source and the another power source are a high voltage source and a low voltage source respectively.

14. The electronic device as claimed in claim 1, further comprising a sensing circuit electrically connected to the driving unit.

15. The electronic device as claimed in claim 14, wherein the sensing circuit comprises a sensing switching element, and the sensing switching element comprises a control end, a first end and a second end electrically connected to a sensing control line, the driving unit and a reference voltage terminal respectively.

16. The electronic device as claimed in claim 1, further comprising a power line and another power line electrically connected to the first switching elements of one and another one of the adjacent two of the plurality of sub-pixel circuits respectively.

17. The electronic device as claimed in claim 1, wherein the adjacent two of the plurality of sub-pixel circuits are arranged in a same column.

18. The electronic device as claimed in claim 1, wherein one of the plurality of sub-pixel circuits comprises a plurality of light emitting elements electrically connected to one another in series.

19. The electronic device as claimed in claim 1, wherein the first switching element is a P-type transistor.

* * * * *